(12) United States Patent  
Faller et al.

(10) Patent No.: US 7,802,763 B2
(45) Date of Patent: Sep. 28, 2010

(54) TOPPING TOOL

(75) Inventors: James Faller, Williamsville, NY (US); Christopher V. Tirone, East Aurora, NY (US); Gerald Oehman, Jackson, WI (US)

(73) Assignee: Rich Products Corporation, Buffalo, NY (US)

( * ) Notice: Subject to any disclaimer, the term of this patent is extended or adjusted under 35 U.S.C. 154(b) by 147 days.

(21) Appl. No.: 11/872,052

(22) Filed: Oct. 15, 2007

(65) Prior Publication Data

US 2008/0087561 A1 Apr. 17, 2008

Related U.S. Application Data

(60) Provisional application No. 60/829,583, filed on Oct. 16, 2006, provisional application No. 60/886,796, filed on Jan. 26, 2007.

(51) Int. Cl.  
*B65B 67/12* (2006.01)

(52) U.S. Cl. .................. 248/95; 248/309.1; 248/311.2; 141/10

(58) Field of Classification Search .................. 248/94, 248/95, 97, 176.1, 176.2, 309.1, 314, 315, 248/206.3, 682, 214, 222.41, 221.12, 27.8; 141/10, 316, 369, 391; 99/426; 206/229, 206/69; 383/13, 33; 220/401  
See application file for complete search history.

(56) References Cited

U.S. PATENT DOCUMENTS 1,186,148 A * 6/1916 Tenney .................. 141/86

| 1,548,986 | A | | 8/1925 | Donovan |
| 2,967,691 | A | | 5/1958 | Lehnbeuter et al. |
| 3,285,202 | A | | 11/1966 | MacManus |
| 3,682,107 | A | | 8/1972 | MacManus |
| 3,991,961 | A | | 11/1976 | Platzer, Jr. |
| 4,250,664 | A | | 2/1981 | Remke |
| 5,074,504 | A | | 12/1991 | Minnick |
| 5,400,990 | A | | 3/1995 | Frankel |
| 5,456,046 | A | * | 10/1995 | Vitalune et al. ............. 47/41.01 |
| 5,538,050 | A | * | 7/1996 | Galdon .......................... 141/10 |
| 6,047,748 | A | * | 4/2000 | Rooker ........................ 141/391 |

(Continued)

FOREIGN PATENT DOCUMENTS

EP 1206910 B1 5/2002

*Primary Examiner*—Gwendolyn Baxter  
(74) *Attorney, Agent, or Firm*—Hodgson Russ LLP

(57) ABSTRACT

A topping tool assembly comprises a bag support defining a tapered receptacle having an open bag receiving end and an open dispensing end narrower than the bag receiving end, a mounting bracket fixed to the bag support, and an anchor bracket, wherein the mounting bracket and the anchor bracket are adapted such that the mounting bracket removably mounts onto the anchor bracket. The topping tool assembly is installed in a kitchen or other food preparation area by attaching the anchor bracket to a suitable supporting surface, and it receives and supports a pastry bag in a generally vertical orientation such that a top of the pastry bag is exposed through the bag receiving end of the bag support and a bottom decorative tip of the pastry bag protrudes from the bottom dispensing end of the bag support. When a pastry bag is supported in this manner, a user may manually apply pressure at the top of the pastry bag and locate a pastry, cake, or other item just beneath the dispensing end while the dispensing tip of the pastry bag remains at a constant position and orientation.

11 Claims, 6 Drawing Sheets

U.S. PATENT DOCUMENTS

| | | |
|---|---|---|
| 6,047,858 A | 4/2000 | Romer |
| 6,206,239 B1 | 3/2001 | Romer |
| 6,267,999 B1 | 7/2001 | Romer et al. |
| 6,268,000 B1 | 7/2001 | Romer |
| 6,460,736 B1 | 10/2002 | D'Agostino |
| 6,971,611 B2 | 12/2005 | Folkmar |
| 7,395,842 B2 * | 7/2008 | Dyer .......................... 141/316 |
| 2003/0091702 A1 | 5/2003 | Folkmar |
| 2005/0170051 A1 | 8/2005 | Folkmar |

* cited by examiner

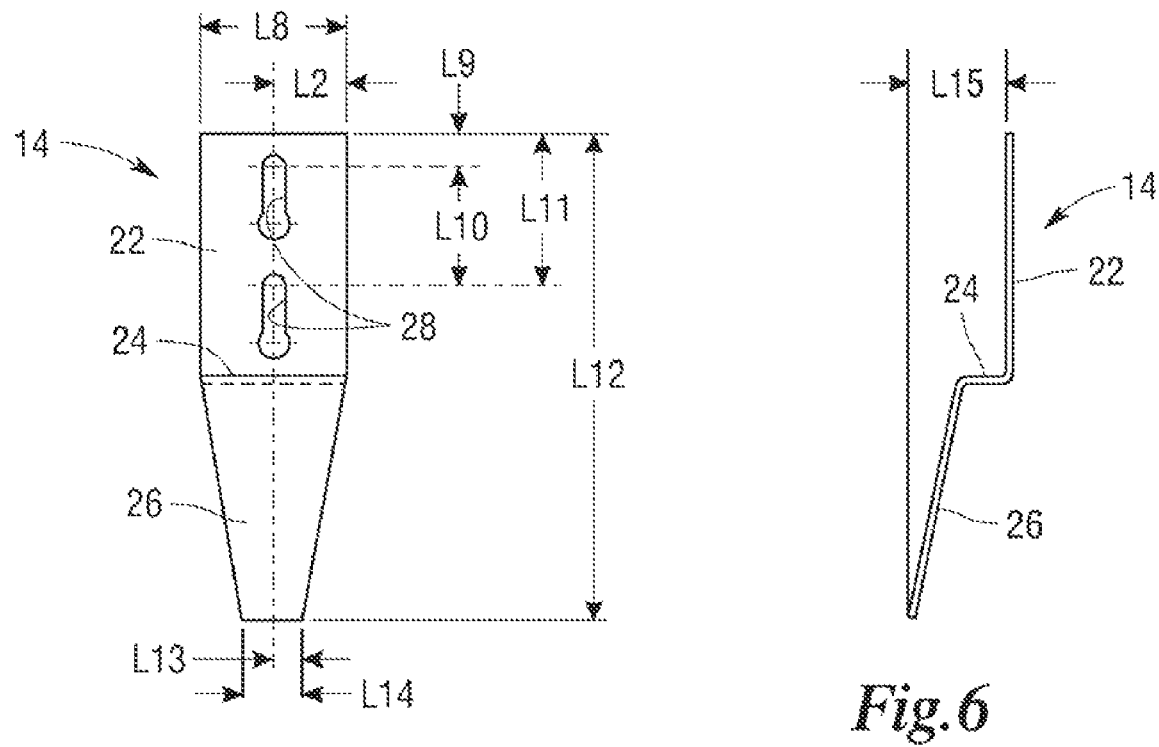
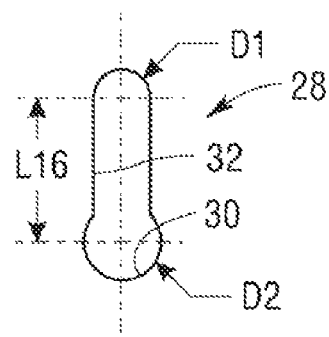
Fig.5
Fig.6
Fig.7

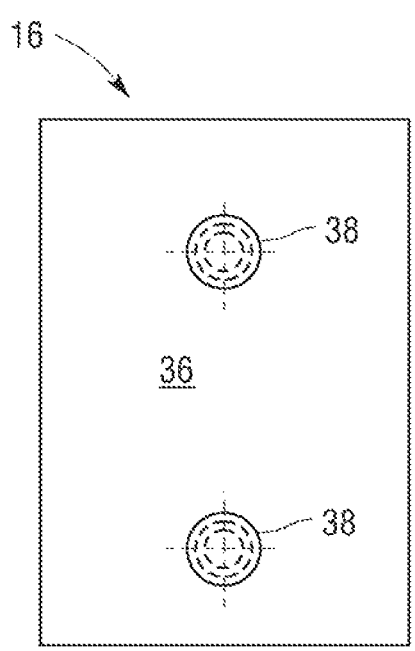
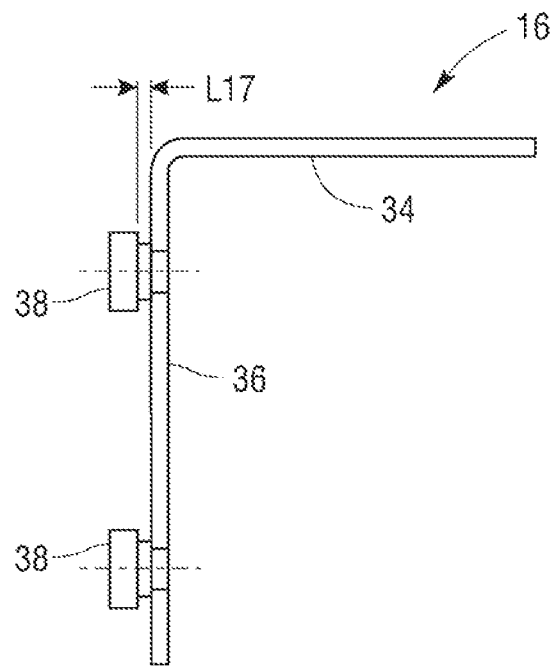
Fig.8    Fig.9
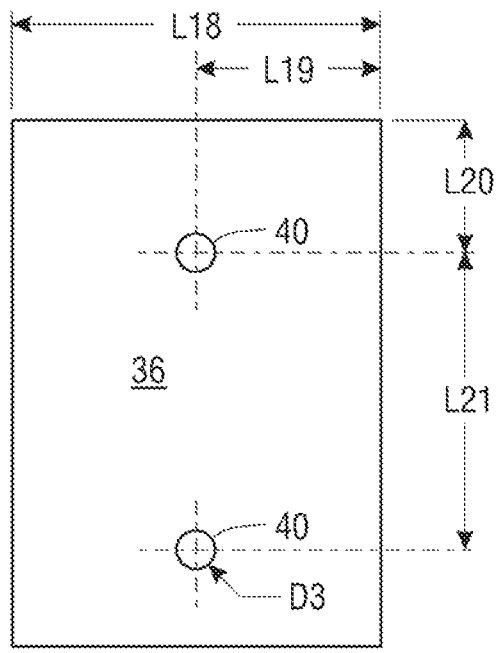
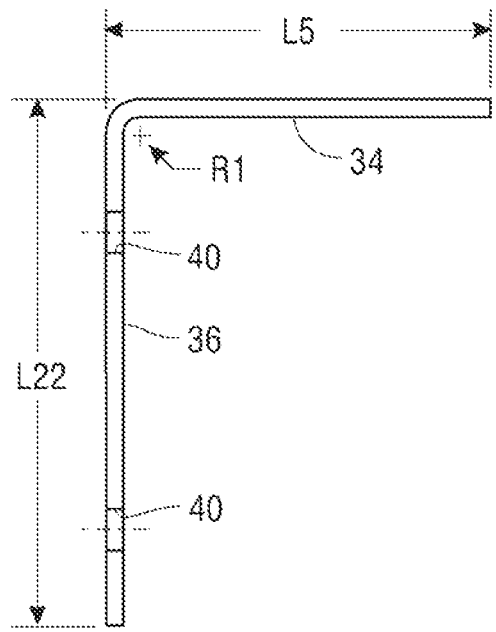
Fig.10    Fig.11

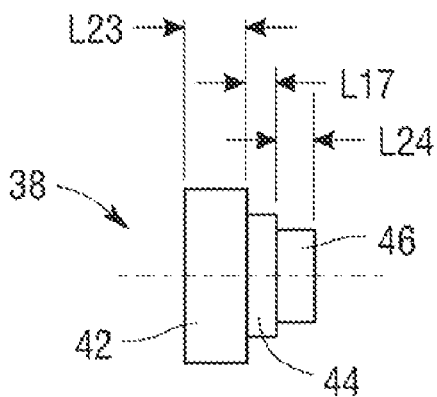
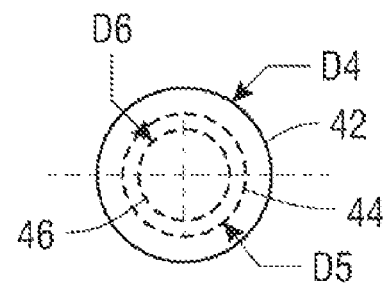
Fig.12    Fig.13
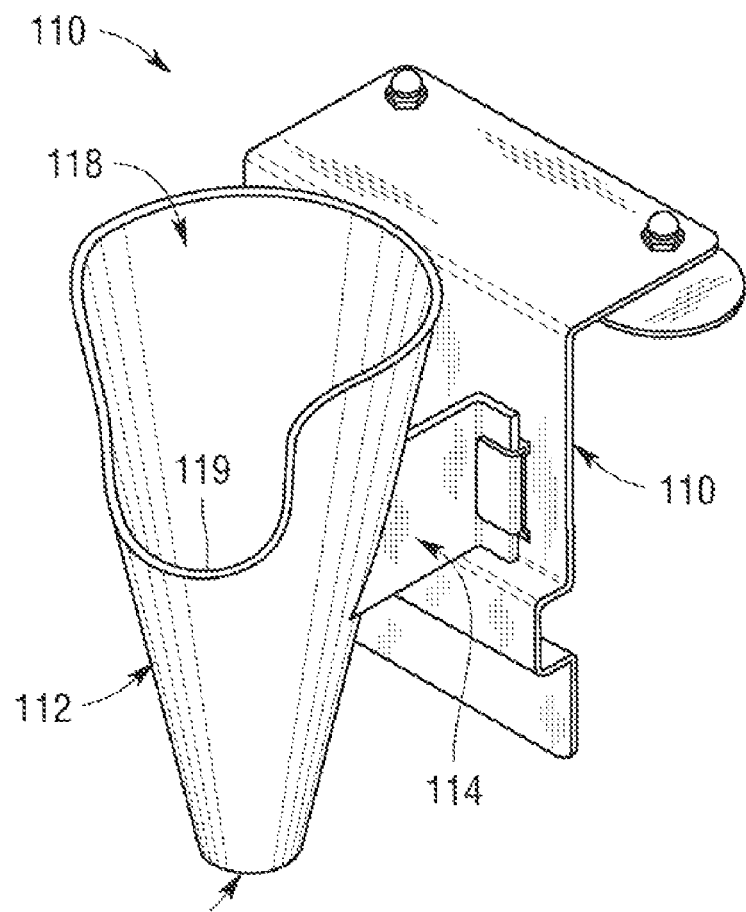
Fig.14

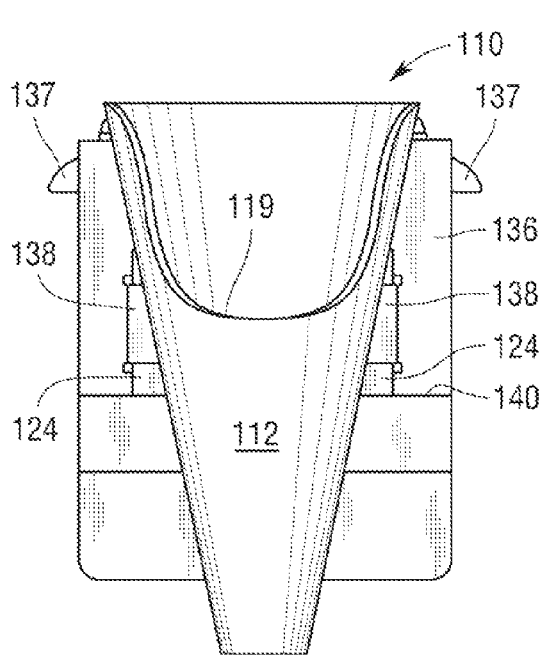
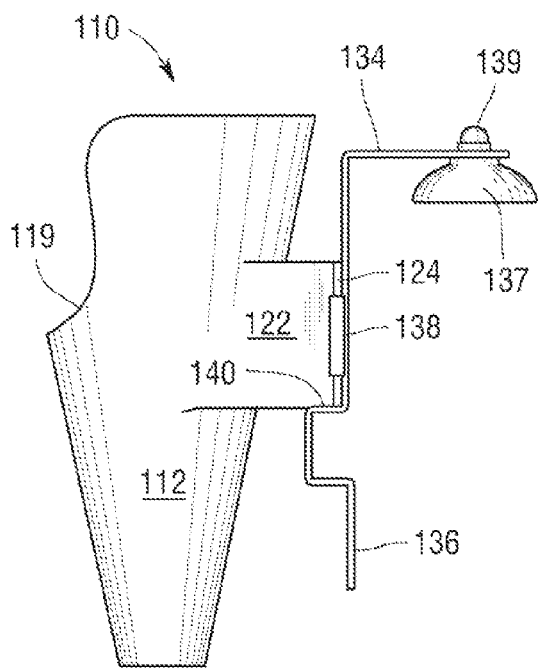
*Fig.15*        *Fig.16*
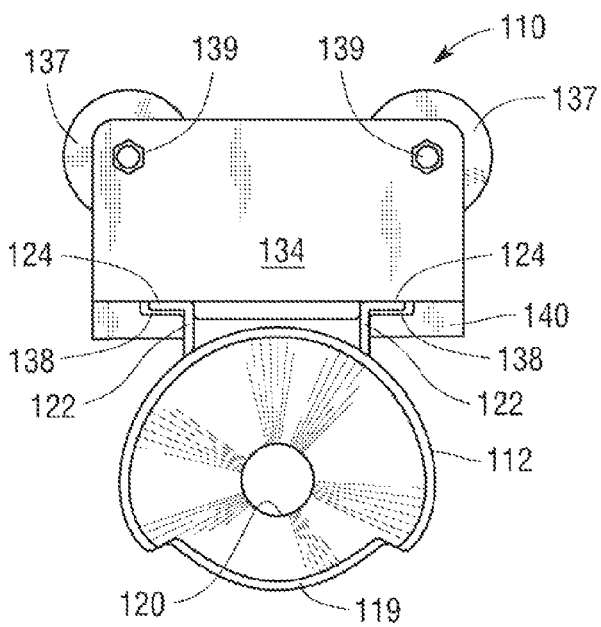
*Fig.17*

TOPPING TOOL

CROSS-REFERENCE TO RELATED APPLICATIONS

This application claims benefit under 35 U.S.C. §119(e) of U.S. Provisional Application No. 60/829,583 filed Oct. 16, 2006 and 60/886,796 filed Jan. 26, 2007, both such provisional applications being incorporated herein by reference.

FIELD OF THE INVENTION

The invention relates generally to the field of culinary tools, and more particularly to a tool for dispensing bagged toppings onto pastry and the like. The tool of the present invention is useful for applying topping or icing to shakes, iced cappuccinos, frozen drinks, hot or cold coffee, cakes, donuts, cupcakes, pancakes, or other food items. The tool of the present invention may also be useful for dispensing food items such as yogurts, mousses, meringues, fillings, and products of a similar consistency.

BACKGROUND OF THE INVENTION

Under current practice, topping or icing for pastry is packaged in generally conical pastry bags for application to pastry or other food items through a decorating tip extending through a bottom tip portion of the bag. Handling of the pastry bag is an entirely manual operation wherein a user must pick up the bag with two hands, wind the back of the bag to pressurize the bag, squeeze the bag with one or two hands, guide the bag tip to the target with one hand, and replace the bag on a countertop or refrigerator shelf upon completing the application. Manually guiding the decorator tip of the pastry bag while applying even pressure requires significant skill, and introduces the risk of contaminating the bag tip. The current practice makes it difficult to apply extra pressure to the bag as may be necessary to dispense "stiff" toppings or icings, and sometimes the bag ruptures or the bag tip dislodges from the end of the pastry bag during a dispensing operation.

SUMMARY OF THE INVENTION

It is therefore an object of the present invention to provide a tool that eliminates the need to manually guide a pastry bag tip while topping is dispensed therefrom.

It is another object of the present invention to provide a tool that allows a user to dispense topping from a pastry bag using only one hand.

It is yet another object of the present invention to provide a tool that controls the location of a pastry bag tip during a dispensing operation to improve the ability of a user to apply topping or icing on an intended location.

It is a further object of the present invention to provide a tool that serves as a storage receptacle for a pastry bag between uses.

It is a further object of the present invention to provide a tool that protects a pastry bag tip from contamination.

It is a further object of the present invention to provide a tool that enables a user to apply extra pressure to the top of a pastry bag during a dispensing operation, especially when the bag contains stiff topping or icing.

It is a further object of the present invention to provide a tool that prevents a pastry bag from rupturing during a dispensing operation.

It is a further object of the present invention to provide a tool that prevents a pastry bag tip from accidentally exiting the bag as pressure is applied.

In view of these and other objects, a topping tool assembly is described and generally comprises a tapered bag support having an open bag receiving end and an open dispensing end narrower than the bag receiving end, a mounting bracket fixed to the bag support, and an anchor bracket, wherein the mounting bracket and the anchor bracket are adapted such that the mounting bracket removably mounts onto the anchor bracket. The topping tool assembly is installed in a kitchen or other food preparation area by attaching the anchor bracket to a suitable supporting surface, and the topping tool assembly receives and supports a pastry bag in a generally vertical orientation such that a top of the pastry bag is exposed through the bag receiving end of the bag support and a bottom decorative tip of the pastry bag protrudes from the dispensing end of the bag support. When a pastry bag is supported in this manner, a user may manually apply pressure at the top of the pastry bag and locate a pastry, cake, or other item just beneath the dispensing end while the dispensing tip of the pastry bag remains at a constant position and orientation. In this way, the present invention obviates much of the skill and dexterity required for a dispensing operation according to prior art methodology.

BRIEF DESCRIPTION OF THE DRAWINGS

The nature and mode of operation of the present invention will now be more fully described in the following detailed description of the invention taken with the accompanying drawing figures, in which:

FIG. 5 is a front elevational view of a mounting bracket of the topping tool assembly shown in FIG. 1;

FIG. 6 is a side elevational view of the mounting bracket shown in FIG. 5;

FIG. 7 is a detail view for indicating preferred dimensions of mounting slots provided in the mounting bracket;

FIG. 8 is a front elevational view of an anchor bracket of the topping tool assembly shown in FIG. 1;

FIG. 9 is a side elevational view of the anchor bracket shown in FIG. 8;

FIG. 10 is a view similar to that of FIG. 8, however the anchor bracket is shown without mounting studs;

FIG. 11 is a view similar to that of FIG. 9, however the anchor bracket is shown without mounting studs;

FIG. 12 is a side elevational view of a mounting stud of the anchor bracket shown in FIGS. 8 and 9;

FIG. 13 is a rear elevational view of the mounting stud shown in FIG. 12;

FIG. 14 is a perspective view of a topping tool assembly formed in accordance with another embodiment of the present invention;

FIG. 15 is a front elevational view of the topping tool assembly shown in FIG. 14;

FIG. 16 is a side elevational view of the topping tool assembly shown in FIG. 14;

FIG. 17 is a top plan view of the topping tool assembly shown in FIG. 14; and

DETAILED DESCRIPTION OF THE INVENTION

Figures 1, 2:
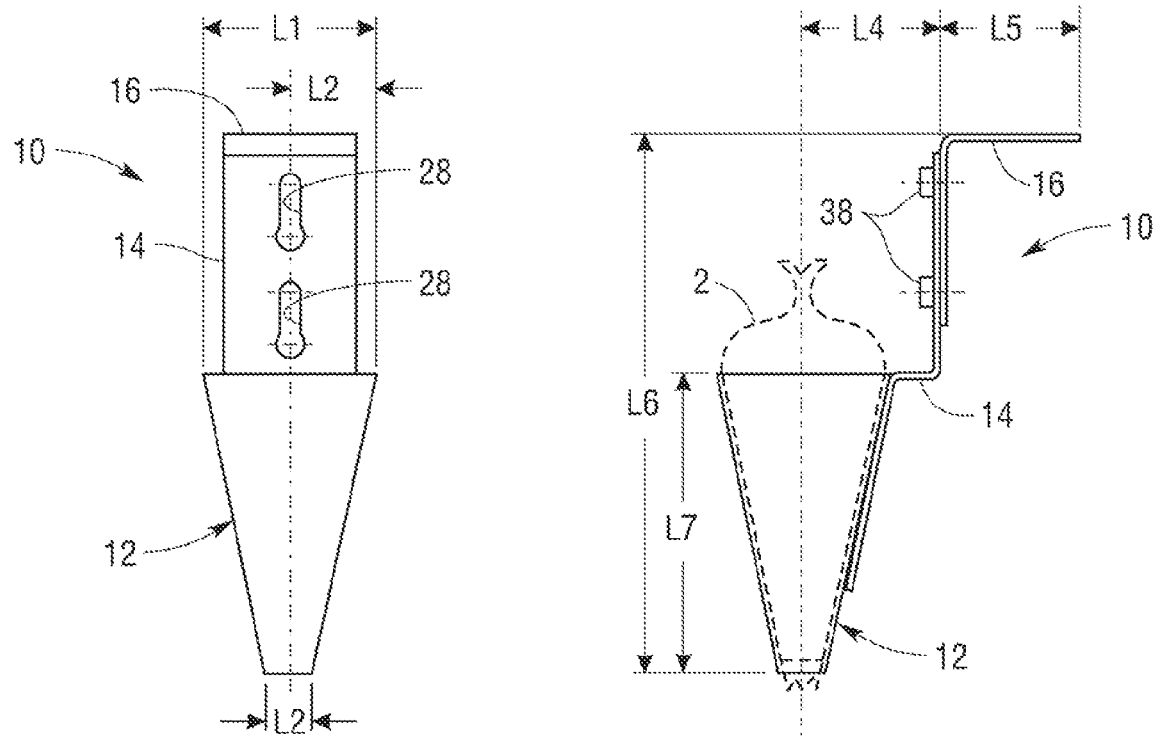
FIG. 1 is a front elevational view of a topping tool assembly formed in accordance with an embodiment of the present invention.
FIG. 2 is a side elevational view of the topping tool assembly shown in FIG. 1, with a bag of topping or icing supported by the topping tool assembly being indicated in broken line.

In the drawing figures, prototype dimensions labeled L1-L24, D1-D6, R1, and A1 are indicated and may have values according to the following table:

| LABEL | FIG. NOS. | VALUE |
|---|---|---|
| L1 | 1; 3 | 3.25 inches |
| L2 | 1; 5 | 1.25 inches |
| L3 | 1; 3 | 0.90 inches I.D. |
| L4 | 2 | 2.65 inches |
| L5 | 2; 11 | 2.60 inches |
| L6 | 2 | 9.88 inches |
| L7 | 2; 3 | 5.50 inches |
| L8 | 5 | 2.50 inches |
| L9 | 5 | 0.50 inches |
| L10 | 5 | 2.00 inches |
| L11 | 5 | 4.00 inches |
| L12 | 5 | 8.00 inches |
| L13 | 5 | 0.500 inches |
| L14 | 5 | 1.00 inches |
| L15 | 6 | 1.75 inches |
| L16 | 7 | 1.38 inches |
| L17 | 9; 12 | 0.108 inches |
| L18 | 10 | 2.50 inches |
| L19 | 10 | 1.25 inches |
| L20 | 10 | 0.88 inches |
| L21 | 10 | 2.00 inches |
| L22 | 11 | 3.50 inches |
| L23 | 12 | 0.187 inches |
| L24 | 12 | 0.120 inches |
| D1 | 7 | 0.375 inches |
| D2 | 7 | 0.508/0.504 inches |
| D3 | 10 | 0.250 inches (two places) |
| D4 | 13 | 0.500 inches |
| D5 | 13 | 0.370 inches |
| D6 | 13 | 0.250 inches |
| R1 | 11 | 0.125 inches |
| A1 | 6 | 12 degrees |

Of course, the indicated dimensions may be changed without straying from the present invention.

Reference is made initially to FIGS. 1 and 2, wherein a topping tool assembly formed in accordance with an embodiment of the present invention is shown and designated generally by reference numeral 10. Topping tool assembly 10 comprises a bag support 12 configured to hold a pastry bag 2 while product is dispensed therefrom and while the pastry bag is not in use, a mounting bracket 14 fixed to bag support 12, and an anchor bracket 16 on which mounting bracket 14 may be releasably mounted.

Figure 4:
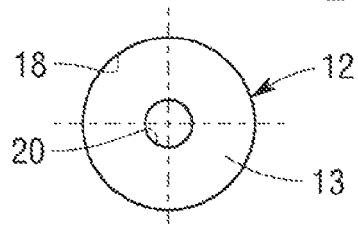
FIG. 4 is a top plan view of the bag support shown in FIG. 3.
Figure 3:
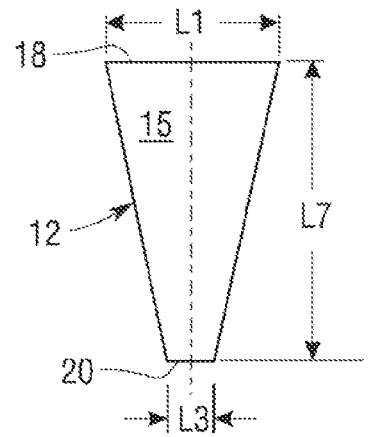
FIG. 3 is a front elevational view of a bag support of the topping tool assembly shown in FIG. 1.

FIGS. 3 and 4 show bag support 12 as being tapered in a frusto-conical shape such that an inner wall surface 13 of bag support 12 defines a tapered receptacle having a wider bag receiving end 18 and a narrower dispensing end 20. Bag support 12 may be formed by rolling a pre-cut piece of flat sheet material, such as stainless steel sheet, and affixing opposing edges of the sheet to one another or to mounting bracket 14. A prototype was constructed using twenty-gauge sheet of grade 304 stainless steel, however plastics or other materials may be used to fabricate bag support 12.

As shown in FIGS. 5 and 6, mounting bracket 14 includes a vertical mounting plate 22 having a pair of elongated slots 28, a spacing ledge 24 extending horizontally and forwardly from a lower edge of mounting plate 22, and a tongue 26 extending in a downward and forward direction from a front edge of spacing ledge 24 at an angle corresponding to a taper angle of an outer wall surface 15 of bag support 12. Slots 28 are spaced apart vertically along mounting plate 22 and are preferably shaped as indicated in FIG. 7 to have an enlarged opening 30 at a lower end of the slot and a narrower elongated portion 32 extending upwardly from the enlarged opening. The side edges of tongue 26 may converge toward one another as they extend downward from ledge 24. Mounting bracket 14 may be formed from a pre-cut piece of flat sheet material by performing drilling and milling operations to make slots 28, and then bending the piece of sheet material to form mourning plate 22, ledge 24, and tongue 26. Bag support 12 is affixed to tongue 26, for example with bag receiving end 18 substantially coplanar with atop surface of ledge 24 as can be seen in FIG. 2. Bag support 12 may be affixed to tongue 26 by welding and/or fasteners (not shown). A prototype of mounting bracket 14 was fabricated using a twelve-gauge sheet of grade 304 stainless steel, however other materials, including without limitation plastics, may be used. If a plastic is used, it is contemplated to mold bag support 12 together with mounting bracket 14 as an integral unit.

FIGS. 8 and 9 show anchor bracket 16 designed to receive mounting bracket 14. Anchor bracket 16 may be a right-angle bracket including an anchor plate 34 and a receiver plate 36 extending perpendicularly from a front edge of the anchor plate. Anchor plate 34 is intended to be mounted flush on an existing horizontal support surface in an installation environment such as a food preparation area. While not shown, anchor plate 34 may be provided with predrilled holes for receiving fasteners to attach anchor plate 34 to the support surface. Receiver plate 36 includes a plurality of forwardly extending mounting studs 38, which may be press fitted into corresponding holes 40 (see FIGS. 10 and 11) in receiver plate 36 or otherwise fixed to the receiver plate. The location and spacing of studs 38 corresponds with the location and spacing of slots 28 in mounting bracket 14 for cooperation between the studs and the slots. While receiver plate 36 of anchor bracket 16 is shown as including only two mounting studs 38, it is contemplated to provide a longer receiver plate 36 with additional mounting studs 38 so that mounting bracket 14 and bag support 12 can be mounted at a plurality of vertical positions to accommodate users of different heights. A prototype of anchor bracket 16 was fabricated from twelve-gauge sheet of grade 304 stainless steel which may be bent to form the right angle before or after holes 40 are drilled and/or studs 38 are press fitted.

Of course, those skilled in the art will recognize that other configurations of anchor bracket 16 may be appropriate. For example, where an environmental support surface to which anchor bracket is to be attached is vertical rather than horizontal, then anchor bracket 16 may be provided as a flat plate with protruding studs 38 rather than as a right-angle bracket. Mounting holes may be provided through the plate of such an anchor bracket to enable it to be fastened to an existing wall or other vertical surface.

As seen in FIGS. 9, 12 and 13, mounting studs 38 may be stepped to provide an enlarged head 42 of a first diameter, a middle portion 44 of a second diameter less than the first diameter, and a base 46 of a third diameter less than the second diameter. Head 42 is sized for receipt through the enlarged opening 30 of a slot 28, but not through the narrower elongated portion 32 of the slot. Middle portion 44 is sized for receipt through narrower elongated portion 32 of the slot, but not through holes 40 in receiver plate 36. Base 46 is sized for press fit into holes 40 in receiver plate 36.

Topping tool assembly 10 is installed by securing anchor bracket 16 at a desired location. More specifically, anchor plate 34 may be attached or affixed to an upwardly facing support, surface provided at the desired location such that receiver plate 36 extends downward from the support surface. Mounting bracket 14 with attached bag support 12 is then mounted on anchor bracket 16 by aligning the enlarged openings 30 of slots 28 with respective heads 42 of corresponding studs 38, moving mounting bracket 14 horizontally toward anchor bracket 16 to insert heads 42 though the respective openings 30, and then moving mounting bracket 14 vertically in a downward direction until the middle portion 44 of each stud 38 engages an upper end of the associated slot 28. As may be understood, heads 42 prevent mounting bracket 14 and bag support 12 from being pulled directly off of the anchor bracket. Removal of mounting bracket 14 and bag support 12 is carried out in reverse fashion by moving mounting bracket 14 upward until openings 30 are aligned with heads 42, and then pulling the mounting bracket horizontally away from anchor bracket 16 until heads 42 pass out of openings 30.

Those skilled in the art will recognize other configurations are possible for removably mounting the mounting bracket onto the support bracket including without limitation snap-in mounting elements, hook-and-slot mounting elements, and traditional threaded fasteners. Moreover, a locking mechanism (not shown) may be provided if one is not inherent in the mounting arrangement in order to prevent unintended removal of mounting bracket 14 and bag support 12 from the anchor bracket.

When topping tool assembly 10 is installed in a kitchen or other food preparation area, it receives and supports a pastry bag in a generally vertical orientation such that a top of the pastry bag is exposed through bag receiving end 18 for manipulation, and a bottom decorative tip of the pastry bag protrudes from dispensing end 20. Topping tool assembly 10 is installed at a height that allows a user to apply pressure at the top of pastry bag 2 while the dispensing tip of the pastry bag remains at a constant position and orientation, whereby the user may position an item receiving the contents of the pastry bag just beneath dispensing end 20 and apply pressure to the top of the bag to dispense topping, icing, or whatever contents are contained in the bag. As will be appreciated, a user may utilize his or her own body weight to exert extra pressure when necessary. Because the bag and decorative tip are firmly supported in bag support 12, ruptures and tip expulsions are prevented. In contrast to the prior art, the topping tool assembly of the present invention simplifies dispensing operations to an extent that even novice users may achieve desired results on a consistent basis. Finally, a pastry bag may simply be left in bag support 12 between dispensing operations, where the pastry bag is conveniently our of the way.

FIGS. 14-17 show a topping tool assembly 110 exemplifying an alternative embodiment of the present invention. Topping tool assembly 110 comprises a bag support 112 configured to hold a pastry bag while product is dispensed therefrom and while the pastry bag is not in use, a mounting bracket 114 fixed to bag support 112, and an anchor bracket 116 on which mounting bracket 114 may be releasably mounted.

Bag support 112 has is tapered in a frusta-conical shape defining a wider bag receiving end 118 and a narrower dispensing end 120. The wall of bag support 112 may be configured with a front dip 119 that expands the opening at bag receiving end 118, whereby placement of a bag into the bag support and is facilitated and larger volume topping bags can be accommodated. Bag support 112 may be formed by molding plastic or by rolling a pre-cut piece of sheet material, for example stainless steel sheet.

Mounting bracket 114 includes a pair of arms 122 extending in a rearward direction from a mid-portion of bag support 112, each arm turning laterally outward at a right angle to provide a pair of mounting flanges 124. As best seen in FIG. 17, mounting arms 122 are long enough to locate flanges 124 beyond the outer diameter of bag receiving end 118 of bag support 112. If a plastic is used to form mounting bracket 114, then mounting bracket 114 may be molded together with bag support 112 as an integral unit. If sheet metal is used to form mounting bracket 112, then the mounting bracket may be fixed to bag support 112 in a manner known in the art, such as by welding, bending, and/or using fasteners.

Anchor bracket 116 is designed to receive mounting bracket 114. Anchor bracket 116 may be a right-angle bracket including an anchor plate 134 and a receiver plate 136 extending perpendicularly from a front edge of the anchor plate. Anchor plate 134 is intended to be mounted on an existing horizontal support surface in an installation environment such as a food preparation area. In the embodiment shown, means for attaching anchor bracket 116 to an existing support surface are associated with anchor plate 134, such means including a pair of suction cups 137 mounted by cap screws 139 extending through holes drilled through the anchor plate such that the suction cups extend from an underside of anchor plate 134. Other attaching means may be used, including vacuum seals, threaded or non-threaded fasteners extending through holes drilled through anchor plate 134 and/or through receiving plate 136, adhesive strips or magnets provided on the underside of anchor plate 134 and/or on receiving plate 136, clamps, spring clips, or other suitable attaching means.

Receiver plate 136 includes a pair of retaining members 138 each defining an upwardly open slot sized for slidably receiving a respective mounting flange 124 of mounting bracket 114. Receiver plate further includes a horizontal ledge 140 located below retaining members 138 for engaging the bottom edges of mounting flanges 124 and a portion of the bottom edges of arms 122 when the mounting flanges are inserted downwardly into the slots defined by retaining members 138.

In the embodiment shown, anchor bracket 116 may be formed from a single piece of sheet metal. Holes for cap screws 139 may be drilled; a pair of oppositely-facing rectangular C-shaped slots may be formed by laser or milling operations to provide a pair of tabs that may be bent to form retaining members 138; ledge 140 may be formed by a series of right angle bends; and anchor plate 134 and receiver plate 136 may be defined by a single right angle bend. A suitable gauge stainless steel sheet may be used to fabricate anchor bracket 116, for example a twenty-gauge sheet of grade 304 stainless steel.

Topping tool assembly 110 is installed by securing anchor bracket 116 at a desired location. More specifically, anchor plate 134 may be attached or affixed to an upwardly facing support surface provided at the desired location such that receiver plate 136 extends downward from the support surface. This may be accomplished using suction cups 137 or other attaching means as may be provided to suit the environment in which topping tool assembly 110 is being installed. Mounting bracket 114 with bag support 112 is then mounted on anchor bracket 116 by aligning mounting flanges 124 with the slots defined by retaining members 138 of the anchor bracket and sliding the mounting flanges 124 downwardly for receipt by the retaining members until ledge 140 prevents further downward movement. Removal of mounting bracket 114 and bag support 112 is carried out in reverse fashion by sliding mounting bracket 114 in an upward direction until mounting flanges 124 are completely out of retaining members 140.

Figure 18:
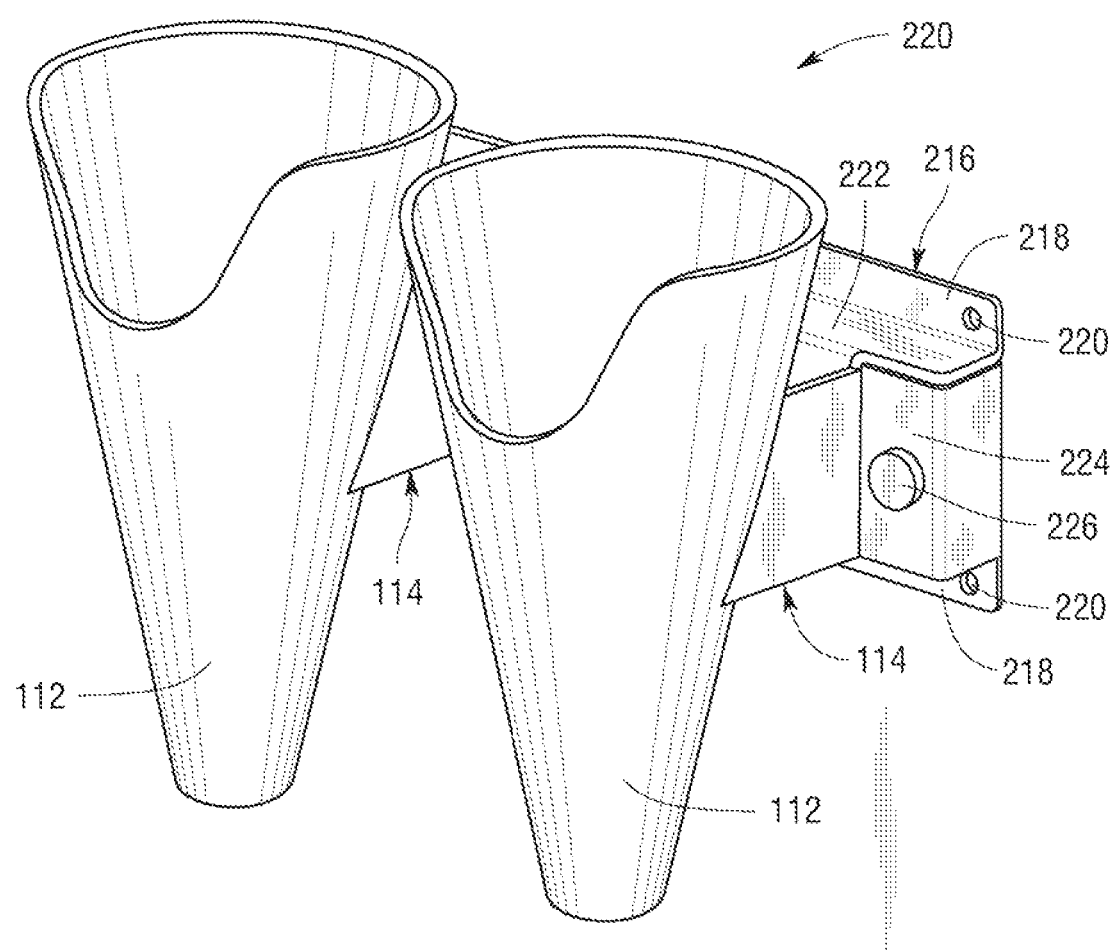
FIG. 18 is a perspective view of a topping tool assembly formed in accordance with a further embodiment of the present invention.

FIG. 18 shows a topping tool assembly 210 according to a further embodiment of the present invention that is generally similar to the embodiment of FIGS. 14-17, except that anchor bracket 116 is replaced by an elongated anchor bracket 216 designed to receive a plurality of mounting brackets 114 and associated bag supports 112. Anchor bracket 216 includes upper and lower mounting flanges 218 each having fastener holes 220 for receiving fasteners to secure anchor bracket 216 to an existing vertical support surface in the installation environment. Anchor bracket 216 further includes an outwardly projecting support rail 222 and a plurality of clamping brackets 224 adjustable by threaded members 226 to releasably clamp mounting flanges 124 to support rail 222. Anchor brackets like the one depicted in FIG. 18 are available from Server Products Inc. under Part Nos. 86632, 86634, and 86636, which correspond to different lengths for mounting one, two, or three bag supports in a row. Of course, the anchor brackets 16 and 116 of the embodiments described above may also be adapted for receiving more than one mounting bracket and associated bag support in a row by lengthening the anchor bracket and including further mounting studs 38 or retaining members 138 as the case may be.

What is claimed is:

1. An apparatus for holding a pastry bag, the apparatus comprising:
   a bag support defining a tapered receptacle having an open bag receiving end and an open dispensing end narrower than the bag receiving end;
   a mounting bracket fixed to the bag support; and
   an anchor bracket;
   wherein the mounting bracket and the anchor bracket are adapted such that the mounting bracket removably mounts onto the anchor bracket, and wherein the mounting bracket includes a vertical mounting plate, a horizontal spacing ledge extending forward from a lower edge of the mounting plate, and an inclined tongue extending downward and forward from a front edge of the spacing ledge, and wherein the bag support is fixed to the tongue.

2. The apparatus according to claim 1, wherein the bag support includes a dip adjacent the bag receiving end.

3. The apparatus according to claim 1, wherein the bag support includes a frusto-conical inner wall defining the tapered receptacle.

4. The apparatus according to claim 3, wherein the bag support is formed from a single piece of sheet material.

5. The apparatus according to claim 1, wherein the bag support includes a frusto-conical outer wall surface having a taper angle, and the tongue of the mounting bracket is inclined at an angle corresponding to the taper angle of the frusto-conical outer wall surface.

6. The apparatus according to claim 1, wherein a plurality of bag supports and respective mounting brackets are provided, and the plurality of mounting brackets are mounted onto the anchor bracket, whereby the apparatus may hold a plurality of pastry bags at one time.

7. An apparatus for holding a pastry bag, the apparatus comprising:
   a bag support defining a tapered receptacle having an open bag receiving end and an open dispensing end narrower than the bag receiving end;
   a mounting bracket fixed to the bag support; and
   an anchor bracket;
   wherein the mounting bracket and the anchor bracket are adapted such that the mounting bracket removably mounts onto the anchor bracket, and wherein the mounting bracket includes a vertical mounting plate having a pair of vertically spaced and vertically elongated slots therethrough, each of the pair of slots having an enlarged opening at an upper end thereof, and the anchor bracket includes a vertical receiver plate having a pair of studs extending in a forward direction therefrom for respective receipt into the pair the pair of slots by way of the enlarged openings.

8. An apparatus for holding a pastry bag, the apparatus comprising:
   a bag support defining a tapered receptacle having an open bag receiving end and an open dispensing end narrower than the bag receiving end;
   a mounting bracket fixed to the bag support; and
   an anchor bracket;
   wherein the mounting bracket and the anchor bracket are adapted such that the mounting bracket removably mounts onto the anchor bracket, and wherein the mounting bracket includes a pair of arms extending in a rearward direction from the bag support, each arm turning laterally outward to provide a pair of mounting flanges, and wherein the anchor bracket includes a vertical receiver plate having a pair of retaining members each defining an upwardly open slot sized for slidably receiving a respective mounting flange of the mounting bracket.

9. The apparatus according to claim 8, wherein the receiver plate further includes a horizontal ledge located below the pair of retaining members for engaging the pair of mounting flanges when the pair of mounting flanges are inserted downwardly into the slots defined by the pair of retaining members.

10. The apparatus according to claim 9, wherein the anchor bracket further includes a horizontal anchor plate extending in a rearward direction from a top edge of the receiver plate, and the anchor plate, receiver plate, retaining members and horizontal ledge are integrally formed from a single piece of sheet material.

11. An apparatus for holding a pastry bag, the apparatus comprising:
   a bag support defining a tapered receptacle having an open bag receiving end and an open dispensing end narrower than the bag receiving end;
   a mounting bracket fixed to the bag support; and
   an anchor bracket;
   wherein the mounting bracket and the anchor bracket are adapted such that the mounting bracket removably mounts onto the anchor bracket, and wherein the mounting bracket includes a pair of arms extending in a rearward direction from the bag support, each arm turning laterally outward to provide a pair of mounting flanges, and wherein the anchor bracket includes an outwardly projecting support rail and a plurality of clamping brackets adjustable by threaded members to releasably clamp the pair of mounting flanges to the support rail.

* * * * *